Dec. 25, 1962 D. E. LIPPKE 3,070,243
FLUIDIZING CONVEYOR
Original Filed Feb. 17, 1959 2 Sheets-Sheet 1

INVENTOR.
DONALD E. LIPPKE
BY
ATTORNEYS

Dec. 25, 1962 D. E. LIPPKE 3,070,243
FLUIDIZING CONVEYOR

Original Filed Feb. 17, 1959 2 Sheets-Sheet 2

INVENTOR.
DONALD E. LIPPKE

ATTORNEYS

3,070,243
FLUIDIZING CONVEYOR

Donald E. Lippke, Delavan, Wis., assignor to Deere & Company, Moline, Ill., a corporation of Delaware
Continuation of application Ser. No. 793,920, Feb. 17, 1959. This application Jan. 25, 1962, Ser. No. 169,708
14 Claims. (Cl. 214—83.28)

This invention relates to an implement of a self-loading and self-unloading type wagon and particularly to this type of wagon which features a fluidizing type of conveyor for loading and unloading the wagon. Still more particularly this invention relates to a new and novel method of conveying grain and similar material by fluidization.

This is a continuation of patent application Ser. No. 793,920 filed February 17, 1959.

In the normal type of self-unloading wagon there is provided a floor conveyor internally of a trailer or box which moves material to one end of the box to a discharge conveyor which moves the material outwardly and generally to one side of the trailer box.

There are several disadvantages to this type of self-unloading wagon, the first being that there is not too much flexibility in the discharge conveyors. For example, if it is desired to load a planter with grain from the self-unloading wagon, it would be necessary to position the trailer in a very definite position relative to the planter so that the discharge elevator or conveyor will feed directly into the hoppers of the planter. Basically, therefore, there is a desirability in providing some type of flexible feeding arrangement so that the trailer will not necessarily have to be exactly positioned relative to the place or location of discharge. Second, the floor conveyor and discharge conveyor serve only the purpose of discharging the material from the trailer box. The automatic self-unloading characteristics of the present day trailer does not take into consideration the requirement of loading the trailer box.

It is therefore the primary purpose of this invention to provide a self-unloading wagon which has a flexible type of discharge conduit which may be swung in any given direction and pass over or around obstructions to reach the discharge area.

It is another purpose of this invention to provide a material unloading system which may operate to unload the wagon box and feed the material to the discharge area or which may operate to feed material from an area remote from the wagon into the wagon.

It is still a further object of the invention to provide with a wagon box a fluidization type of unloader which is of a new and novel design which may be used in combination with a trailer or may be used to move grain or similar material from one area to another. It is proposed to provide a structure moving the grain by fluidization which is both new and novel and incorporates a relatively small quantity of structure so as to minimize the cost of manufacture and maintenance of the unit.

Other objects and advantages of the invention will become apparent to those skilled in the art as the nature of the invention is better understood from the following description and as shown in the accompanying drawings.

Figure 1:
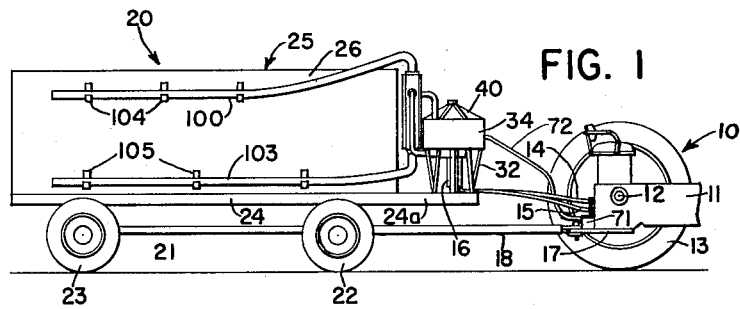
FIG. 1 is a side view of a self-unloading wagon incorporating the features of the present invention and the rear portion of a tractor.
Figure 2:
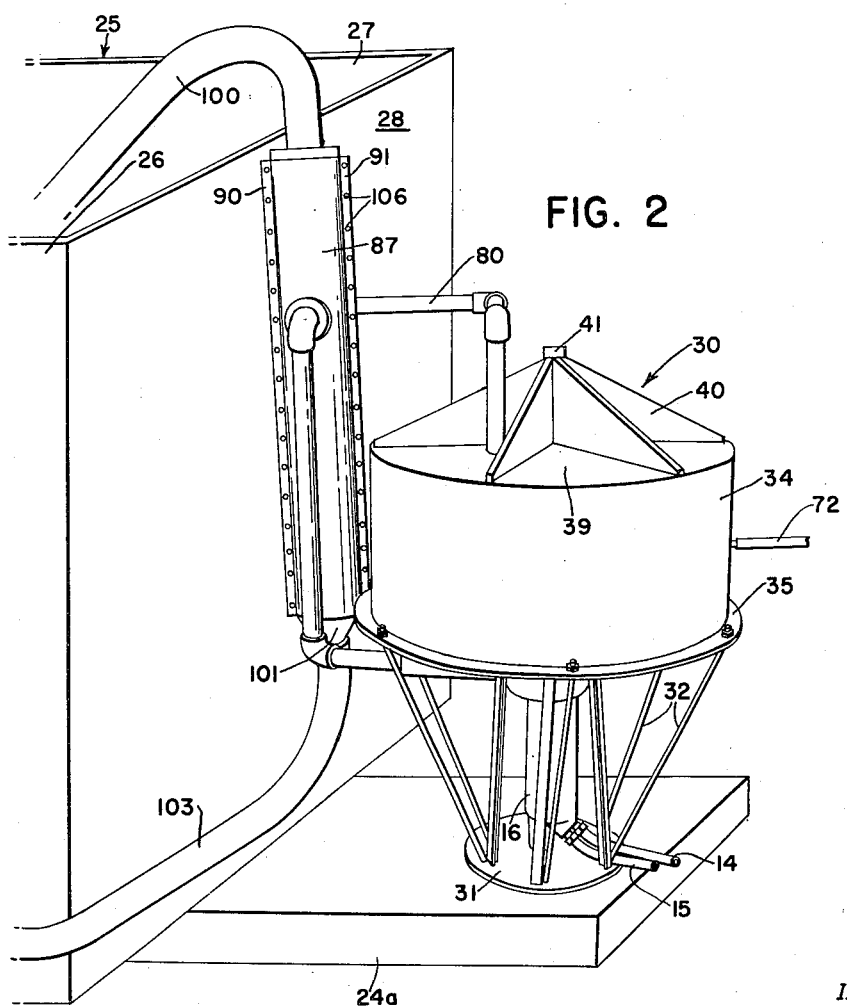
FIG. 2 is a front and right perspective view of the forward end of the self-unloading trailer.

Referring first to FIG. 1, a tractor 10 includes an elongated body 11 having a rear transverse axle structure 12 carrying a pair of rear traction wheels, only one of which is shown at 13 which supports the rear end of the tractor. Incorporated in the tractor body 11 is a conventional type hydraulic system. Extending rearwardly from the hydraulic system are a pair of hydraulic hoses 14, 15 which are connected to a double acting remote hydraulic cylinder 16. Mounted on the underside and extending rearwardly from the tractor body 11 is a drawbar 17 which connects to a forwardly extending tongue or draft member 18.

The implement, indicated in its entirety by the reference numeral 20 is drawn by the tongue 18 and includes besides the tongue a trailer gear or chassis 21 including front and rear wheels 22, 23 respectively. The gear supports a fore-and-aft extending box frame 24 underlying an elongated trailer box 25. The trailer box includes transversely spaced side walls 26, 27 interconnected by a floor, not shown, a rear wall, also not shown, and a front transverse wall 28. The term trailer or wagon when used herein should be treated as generic to all forms of material container regardless of whether it is stationary or mounted on a mobile frame such as a supporting gear or truck body.

A forward portion 24a of the frame 24 extends forwardly from the front wall 28 and serves as a platform for a cylindrical pump structure indicated in its entirety by the reference numeral 30. The cylindrical structure 30 includes therein a plate 31 fixed to the platform 24a and having angularly spaced and upwardly extending columnar supports 32 supporting at their upper ends an enlarged round plate 33. Resting on the upper surface of the plate 33 is an upright cylindrical or drum member 34 which has an outwardly extending flange at its lower end. A suitable seal 36 is provided between the flange 35 and the upper surface of the plate member 33. The drum 34 and plate 33 are bolted together at the flange 35 by means of bolts 37. The drum 34 is closed at its upper end by an integral end plate 39 having upright trusses 40 extending radially inwardly and upwardly from its edge to a hollow or tubular portion 41 concentric with the axis of the drum 34.

Mounted within the drum 34 is a piston 42 formed of an annular member 43 having a U-shaped cross section with upper and lower plates 44, 45 welded as at 46 to upper and lower flanges of the U-shaped member 43. Welded at 48 to the upper surface of the plate 44 is a centrally located upwardly projecting shaft 49 which is received in the tubular member 41, the latter operating as a guide for the shaft 49 in its vertical movement. Welded at 50 to the lower face of the plate member 45 and centrally located relative thereto is a downwardly projecting tubular shaft 51 which fits over and is pinned at 52 to the upper end of the ram 53 which is part of the remote hydraulic cylinder 16.

Figure 3:
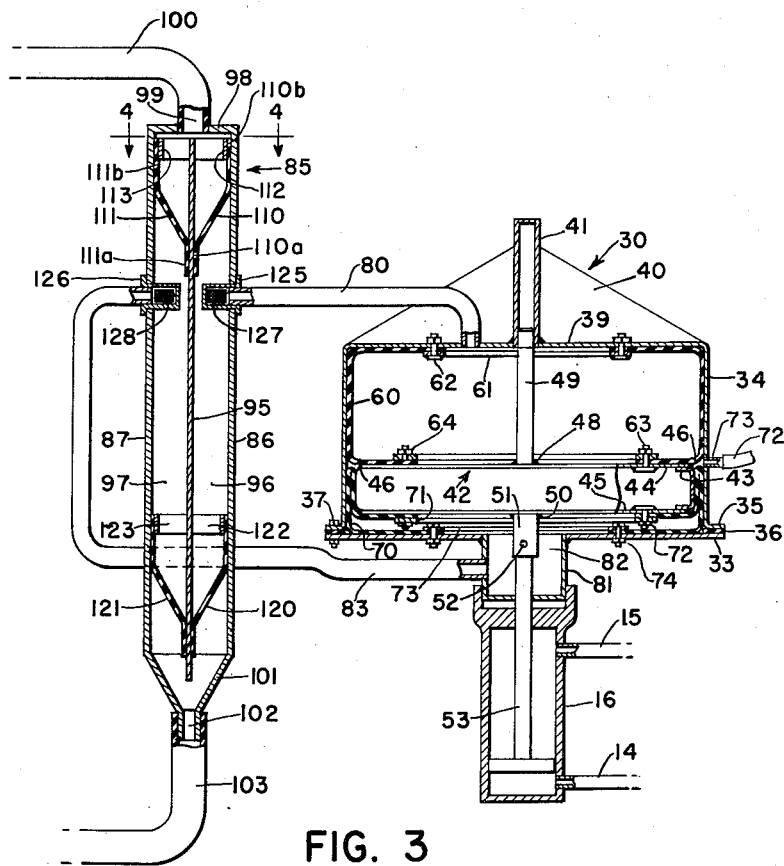
FIG. 3 is a vertical sectional view, partially schematic, showing the operation of the fluidization structure.
Figure 4:
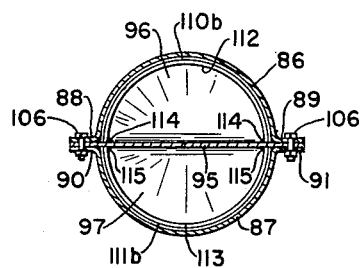
FIG. 4 is a sectional view taken substantially along the line 4—4 of FIG. 3.

Mounted between the upper wall 39 and the plate 44 of the piston and lying adjacent the interior surface of the drum 34 is a rubber diaphragm liner or other type of flexible liner 60. The liner 60 is connected to the upper wall 39 by means of a ring 61 which clamps the upper portion of the liner 60 between it and the wall 39. Bolt and nut combinations, as at 62, operate to tighten the ring 61 so as to prevent leakage of air. The lower portion of the liner 60 is sealed against the upper surface of the plate 44 by means for a ring 63 which clamps the liner 60 to the plate 44. Bolts, as at 64, serve as tightening means for the ring 63. A second rubber or flexible liner 70 extends around the inner surface of the outer walls of the drum 34 and is connected to the lower wall 45 of the piston and to the upper surface of the plate 33 at the base of the cylinder 34. The liner 70 is sealed against the wall 45 by means of a ring 71 which clamps the liner 70 between itself and the wall 45 and is tightened against the liner by means of bolts 72. The lower portion of the liner 70 is connected to the plate 33 by means of a ring 73 which clamps the liner 70 against the upper surface of the plate 33 and is tightened on the liner 70 by means of bolt and nut combinations 74. As may be seen in FIG. 3, the outer periphery of the piston 42 is spaced from the inner surface of the drum 34 so that a double layer of liner may be folded between the two surfaces. Consequently, as the piston 42 moves into a position at the lower end of the drum 34, the lower liner 70 will be folded in the manner shown in FIG. 3. As the piston 42 moves to a position at the upper end of the drum 34, the upper liner 60 will fold into a double layer between the surface of the piston and the inner surface of the drum 34. At this time, the liner 70 will open up and generally lie adjacent to the lower surface of the piston 42, the walls of the drum 34 and the plate 33. Generally speaking, therefore, the liners 60, 70 are diaphragms within the cylinder or drum walls 34.

Supported on the tractor 10 adjacent to and driven by its power take-off shaft, not shown, is a vacuum air pump 71. An air line or hose 72 extends between the pump 71 and the drum walls 34, a short nozzle 73 being provided to receive the end of the hose. The pump 71 maintains a vacuum between the walls of the drum 34 and the diaphragms 60, 70 so as to prevent their collapsing upon vacuum being created within the diaphragms.

Leading from the upper wall 39 of the drum 34 is a conduit which is made of pipe 80. The pipe 80 has a direct opening or port into the upper end of the cylinder 34. The lower end of the cylinder 30 is provided with structure 81 forming a lower chamber 82. The walls of the structure 81 are provided with a port or opening leading directly to a conduit 83 composed of pipe.

The pipes or conduits 80, 83 lead to a valve assembly, indicated in its entirety by the reference numeral 85. The valve assembly 85 is composed of a pair of elongated semi-cylindrical shell sections 86, 87, each flanged outwardly at opposite edges, as at 88, 89 and 90, 91, respectively for connection together to form an elongated cylindrical shaped member. Between the flanges 88, 89 and 90, 91 is a divider plate 95 which divides the cylinder into a pair of chambers 96, 97. The divider plate terminates short of the ends of the cylinder so to provide access to each member 96, 97 from opposite ends of the cylinder. An end wall 98 is provided at the upper end of the cylinder and closes that end except for a port 99 which opens to a material inlet conduit or hose 100. The lower end of the valve cylinder has a cone-shaped wall structure 101 which has a port 102 at its lower end which opens into an outlet hose or conduit 103. Viewing FIG. 1, the hoses 100, 103 are of the flexible type and are of considerable length, the hoses themselves being mounted on the wall 26 by means of hanger brackets 104, 105 when the hoses are not in use.

Referring again to the valve cylinder, the sections 86, 87 are bolted together by means of longitudinally spaced bolt and nut combinations 106. Also, as mentioned previously, the divider plate 95 terminates short of the ends of the valve cylinder so that access to the inlet hose 100 may be made to either chamber 96, 97 and access from the chambers 96, 97 may be had into the outlet hose 103.

As will later become apparent, grain or material flowing through the conduits 100, 103 will normally be drawn in the inlet hose 100 and will flow downwardly through the valve assembly 85 to be discharged from the assembly through the discharge conduit 103. Consequently, the upper end of the valve assembly will be treated as the upstream end and the lower end as the downstream end. Positioned at the upper or upstream end of the valve assembly 85 are a pair of check valves 110, 111 opening into the chambers 86, 87 respectively. The valves 110, 111 are basically a rubber or other type of plastic constructed plate or valve molded at one of their ends to semi-cylindrical sections 110b, 111b with the lower ends 119a, 111a formed to lie adjacent to and in contact with the divider plate 95. A pair of semi-annular rings 112, 113 are provided in the interior of the sections 86, 87 and are welded as at 114, 115 to opposite sides of the divider plate 95. The rings 112, 113 are smaller in diameter than the shells 86, 87 and consequently provide small gaps between the outer surfaces of the rings 112, 113 and the inner surfaces of the shells 86, 87. Provided in these gaps are the upper ends of the valves 110b, 111b. In assembling the valve assembly 85, the valves 110, 111 are first positioned over the ring sections 112, 113 and the shell sections 86, 87 are placed over the valves and upon tightening down on the bolts 106, the semi-annular portions of the valves 110, 111 create a seal between the outer surfaces of the ring members 112, 113 and the inner surfaces of the semi-cylindrical shells 86, 87.

Positioned at the lower or discharge end of the valve assembly 85 is a second pair of one-way or check valves 120, 121 which are substantially identical to the upper valves 110, 111 and are mounted in the cylindrical shells by means of semi-annular rings 122, 123, also identical to the rings 112, 113.

The pipes or conduits 80, 83 extending from opposite ends of the pump or cylinder assembly 30 open into opposite chambers 96, 97. Suitable mounting structure as at 125, 126 is provided to maintain the conduits 80, 83 in a sealed relation to the walls 86, 87 of the chamber. Screens of grilles 127, 128 are provided on the ends of the conduits 80, 83 and internally of the chambers 96, 97 and prevent grain or other material within the chambers from passing into the pump cylinder or drum 34.

The present invention will operate in the following manner. For purposes of filling the trailer box 25, the intake hose 100 may have its inward end pass into a grain bin or other type of container and the outlet hose 103 may have its outlet end communicating with or positioned inside of the trailer box 25. For discharging the trailing box 25, the reverse placing of the hoses will be done, the hoses 100, 103 being flexible to permit the location of their ends in any of an infinite number of locations. It should also be recognized that during transport, the hoses may be placed on the hangers 104, 105 where they will be readily available for discharge or loading as the case may be.

The structure forming the fluidization of the grain or material operates in the following manner. Reviewing particularly FIG. 3, the remote cylinder 16 is connected to the lower end of the piston 42 and is reciprocated from the operator's station on the tractor. Assuming that the piston 42 has reached its maximum downward position and is beginning its upward movement, pressure will be created in the upper portion of the drum 34 and will pass through the pipes 80 into the chamber 96. Grain contained in that chamber will then pass under the valve 120 and into the discharge hose 103. At the same time that the piston 42 is moving upwardly, there will be created a suction in the lower end of the drum 34 which will cause air to be drawn through the conduit 43 thereby creating a suction within the chamber 97. This will cause grain to pass under the valve 111 and into the chamber 97. Since there is suction in the chamber 97, the valve 121 will be caused to remain closed by the suction. Similarly, due to the pressure in the chamber 96, thereby preventing the grain from passing out of the chamber 97. Similarly, since there is a pressure in the chamber 96, the valve 110 will be forced closed thereby preventing grain from entering from the intake conduit 100 into the chamber 96. On the return or downstroke of the piston 42, pressure will exist in the chamber 97 causing the grain trapped in the chamber to pass under the valve 121 into the discharge hose 103 and suction will be created in the chamber 96 causing grain to pass from the inlet hose 100 into the chamber 96. Consequently, in either stroke of the piston 42, there is created a resultant suction on the grain in one of the chambers 96, 97 to move the grain through the hose 100 into the valve assembly 85 and resultant pressure in the other of the chambers 96, 97 to discharge the grain out of the valve assembly 85 into the discharge hose 103.

While only one form of the invention has been shown, it should be recognized that other forms and variations as well as other uses of the principles of the invention will occur to those skilled in the arts. Consequently, it should be understood that while the present disclosure was made in detail for purposes of fully and concisely illustrating the principles of the invention, it was not the intention to so limit or narrow the invention beyond the broad general manner set forth in the appended claims.

What is claimed is:

1. For use with a combination trailer and tractor in which the tractor has a hydraulic system including a remote hydraulic cylinder and the trailer has a main mobile frame with a material container mounted thereon, a cylinder supported on the frame having ports at opposite ends thereof; a piston reciprocable within the cylinder; a flexible material output conduit; a flexible material input conduit; valve mechanism supported on the frame interconnecting the input and output conduits, said valve mechanism being composed of a pair of chambers, each of the chambers having an inlet port opening to the input conduit and an output port opening to the output conduit, a first check valve in each of the valve chambers adjacent the input port admitting material from the input conduit into the respective chamber and restricting movement of material from the chamber into the input conduit, a second check valve in each of the valve chambers spaced downstream from the first valve admitting material from the chamber into the output conduit and restricting movement of material from the output conduit into the chamber; conduit means connecting one of the ports of the cylinder to one of the chambers between its first and second valve and the other port of the cylinder to the other of the chambers between its first and second valve; and means connecting the remote cylinder to the piston to effect reciprocation of the piston within its cylinder to alternately create suction and pressure respectively within each of the chambers.

2. For use with a combination trailer and tractor in which the tractor has a hydraulic system including a remote hydraulic cylinder; and the trailer has a main mobile frame with a material container mounted thereon, a cylinder supported on the frame having ports at opposite ends thereof; a piston reciprocable within the cylinder; a flexible material output conduit; a flexible material input conduit; valve mechanism supported on the frame interconnecting the input and output conduits, said valve mechanism being composed of a pair of chambers, each of the chambers having an inlet port opening to the input conduit and an output port opening to the output conduit, a first check valve in each of the valve chambers adjacent the input port effective to open by suction within its respective chamber to admit material from the input conduit into the chamber, a second check valve in each of the chambers spaced downstream from the first valve effective to open by pressure within the chamber to admit material from the chamber into the output conduit; conduit means connecting one of the ports of the cylinder to one of the chambers between its first and second valve and the other port of the cylinder to the other of the chambers between its first and second valve; and means connecting the remote cylinder to the piston to effect reciprocation of the piston within its cylinder to alternately create suction and pressure respectively within each of the chambers.

3. A self-unloading wagon comprising: a main mobile frame; a material container mounted thereon; a cylinder supported on the frame having ports at opposite ends thereof; a piston reciprocable within the cylinder; a material output conduit; a material input conduit; valve mechanism supported on the frame interconnecting the input and output conduits, said valve mechanism being composed of a pair of chambers, each of the chambers having an inlet port opening to the input conduit and an output port opening to the output conduit, a first check valve in each of the valve chambers adjacent the input port effective to open by suction within its respective chamber to admit material from the input conduit into the chamber, a second check valve in each of the chambers spaced downstream from the first valve effective to open by pressure within the chamber to admit material from the chamber into the output conduit; conduit means connecting one of the ports of the cylinder to one of the chambers between its first and second valve and the other port of the cylinder to the other of the chambers between its first and second valve; and means on the frame effecting reciprocation of the piston within its cylinder to alternately create suction and pressure respectively within each of the chambers.

4. A self-unloading wagon comprising: a main mobile frame; a material container mounted thereon; a cylinder supported on the frame having ports at opposite ends thereof; a piston reciprocable within the cylinder; a material output conduit; a material input conduit; valve mechanism supported on the frame interconnecting the input and output conduits, said valve mechanism being composed of a pair of valve chambers, each of the chambers having an inlet port opening to the input conduit and an output port opening to the output conduit, and valve means within the chambers effective upon suction being created within the chamber to admit material from the input conduit into the chamber and effective upon pressure within the chamber to admit material from the chamber into the output conduit; conduit means connecting one of the ports of the cylinder to one of the chambers and the other port of the cylinder to the other of chambers; and means on the frame effecting reciprocation of the piston within its cylinder to alternately create suction and pressure respectively within each of the chambers.

5. A fluidizing conveying system for grain and similar material comprising: a cylinder having ports at opposite ends thereof; a piston reciprocable within the cylinder; a material output conduit; a material input conduit; valve mechanism interconnecting the input and output conduits, said valve mechanism being composed of a pair of valve chambers, each of the chambers having an inlet port opening to the input conduit and an output port opening to the output conduit, a first check valve in each of the valve chambers adjacent the input port admitting material into the respective valve chamber and restricting movement of material from the chamber into the input conduit; a second check valve in each of the valve chambers spaced downstream from the first valve admitting material from the chamber into the output conduit and restricting movement of material from the output conduit into the chamber; conduit means connecting one of the ports of the cylinder to one of the chambers between its first and second valve and the other port of the cylinder to the other of the chambers between its first and second valve; and means reciprocating the piston within the cylinder to alternately create suction and pressure respectively within the valve chambers.

6. A fluidizing conveying system for grain and similar material comprising: a cylinder having ports at opposite ends thereof; a piston movable within the cylinder; an output conduit; an input conduit; valve mechanism interconnecting the input and output conduits, said valve mechanism being composed of a pair of valve chambers, each of the chambers having an inlet port opening to the input conduit and an output port opening to the output conduit, valve means within each of the chambers one part of which is effective to open upon suction being created within the chambers to admit material into the valve chamber and another part of which is effective to open upon pressure within the chamber to permit the material to leave the respective chamber; conduit means connecting one of the ports of the cylinder to one of the chambers and the other port of the cylinder to the other of the chambers; and means moving the piston within the cylinder to alternately create suction and pressure respectively within the valve chambers.

7. The invention defined in claim 6 in which the valve means includes a cylindrical hollow wall structure having an intake port at one end and a discharge port at the other, a longitudinal plate extending across the structure to form said structure into the pair of chambers of semicylindrical cross section with the plate being a common wall of both chambers, said plate terminating at opposite ends short of the intake port and discharge port thereby leaving each chamber open to the intake and discharge ports and the valve means includes a first valve at the intake end of each chamber, each of the first valves being composed of a valve plate connected at its one end to the wall structure and extending downstream and toward the longitudinal plate to an opposite end lying adjacent the latter plate and the valve means further includes a second valve at the discharge end of each chamber, each of said second valves being composed of a valve plate connected at its one end to the wall structure and extending downstream and toward the longitudinal plate to an opposite end lying adjacent the latter plate.

8. The invention defined in claim 7 in which the valve plates are composed of a flexible and resilient type of material.

9. An implement comprising: a main mobile frame; a material container mounted thereon; a first cylinder supported on the frame having ports at opposite ends and closed by opposite end structure; a member reciprocable within the cylinder; a pair of annular diaphragm elements attachable to opposite end structures and to opposite sides of the reciprocable member whereby reciprocation of the member will alternately expand and contract the diaphragm elements; a flexible material input conduit; a material output conduit leading to the material container; valve mechanism supported on the frame interconnecting the input and output conduits, said valve mechanism being composed of a pair of chambers, each of the chambers having an inlet port opening to the input conduit and an output port opening to the output conduit, a first check valve in each of the valve chambers adjacent the input port admitting material from the input conduit into the respective chamber and restricting movement of material from the chamber into the input conduit, a second check valve in each of the valve chambers spaced downstream from the first valve admitting material from the chamber into the output conduit and restricting movement of material from the output conduit into the chamber; conduit means connecting one of the ports of the cylinder to one of the chambers between its first and second valve and the other port of the cylinder to the other of the chambers between its first and second valve; a second cylinder adjacent the first; a piston within the latter cylinder connected to the reciprocating member and fluid means connected to the second cylinder for effecting reciprocation of the piston and reciprocable member.

10. An implement comprising: a main mobile frame; a material container mounted thereon; a cylinder supported on the frame having ports at opposite ends and closed by opposite end structure; a member reciprocable within the cylinder; a pair of annular diaphragm elements attachable to opposite end structures and to opposite sides of the reciprocable member whereby reciprocation of the member will alternately expand and contract the diaphragm elements; a flexible material input conduit; a material output conduit leading to the material container; valve mechanism supported on the frame interconnecting the input and output conduits, said valve mechanism being composed of a pair of chambers, each of the chambers having an inlet port opening to the input conduit and an output port opening to the output conduit, a first check valve in each of the valve chambers adjacent the input port admitting material from the input conduit into the respective chamber and restricting movement of material from the chamber into the input conduit, a second check valve in each of the valve chambers spaced downstream from the first valve admitting material from the chamber into the output conduit and restricting movement of material from the output conduit into the chamber; conduit means connecting one of the ports of the cylinder to one of the chambers between its first and second valve and the other port of the cylinder to the other of the chambers between its first and second valve; and means on the frame effecting reciprocation of the reciprocable member.

11. An implement comprising: a main mobile frame; a material container mounted thereon; a first cylinder supported on the frame having a port at one end and closed at that end by end wall structure; a member reciprocable within the cylinder; an annular diaphragm element within the cylinder attachable to the end structure and to the reciprocable member whereby reciprocation of the member will alternately expand and contract the diaphragm element; a flexible material input conduit; a material output conduit leading to the material container; valve mechanism supported on the frame interconnecting the input and output conduits, said valve mechanism being composed of a chamber having an inlet port opening to the input conduit and an output port opening to the output conduit, a first check valve in the valve chamber adjacent the input port admitting material from the input conduit into the respective chamber and restricting movement of material from the chamber into the input conduit, a second check valve in the valve chamber spaced downstream from the first valve admitting material from the chamber into the output conduit and restricting movement of material from the output conduit into the chamber; conduit means connecting the port of the cylinder to the chamber between its first and second valve; a second cylinder adjacent the first; a piston within the latter cylinder connected to the reciprocable member; and fluid means connected to the second cylinder for effecting reciprocation of the piston and reciprocable member.

12. An implement comprising: a main mobile frame; a material container mounted thereon; a first cylinder supported on the frame having a port at one end and closed at that end by end wall structure; a member reciprocable within the cylinder; an annular diaphragm element within the cylinder attachable to the end structure and to the reciprocable member whereby reciprocation of the member will alternately expand and contract the diaphragm element; a flexible material input conduit; valve mechanism supported on the frame composed of a chamber having an inlet port opening to the input conduit and an output port communicating with the container, a first check valve in the valve chamber adjacent the input port admitting material from the input conduit into the respective chamber and restricting movement of material from the chamber into the input conduit, a second check valve in the valve chamber spaced downstream from the first valve admitting material from the chamber into the container and restricting movement of material from the output conduit into the chamber; communicating means connecting the port of the cylinder to the chamber between its first and second valve; a second cylinder adjacent the first; a piston within the latter cylinder connected to the reciprocable member; and fluid means connected to the second cylinder for effecting reciprocation of the piston and reciprocable member.

13. An implement comprising: a main mobile frame; a material container mounted thereon; a first cylinder supported on the frame having a port at one end and closed at that end by end wall structure; a member reciprocable within the cylinder; an annular diaphragm element within the cylinder attachable to the end structure and to the reciprocable member whereby reciprocation of the member will alternately expand and contract the diaphragm element; a flexible material input conduit; valve mechanism supported on the frame composed of a chamber having an inlet port opening to the input conduit and an output port communicating with the container, a first check valve in the valve chamber adjacent the input port admitting material from the input conduit into the chamber and restricting movement of material from the chamber into the input conduit, a second check valve in the valve chamber spaced downstream from the first valve admitting material from the chamber into the container and restricting movement of material from the output conduit into the chamber; communicating means connecting the port of the cylinder to the chamber between its first and second valve and means on the frame effecting reciprocation of the reciprocable member.

14. The invention defined in claim 13 in which the communicating means is a conduit between the cylinder and chamber and further characterized by a screening device for the end of the conduit and adjacent its entry into the chamber.

References Cited in the file of this patent

UNITED STATES PATENTS

| | | |
|---|---|---|
| 901,138 | Willis | Oct. 13, 1908 |
| 1,609,401 | Crites et al. | Dec. 7, 1926 |
| 2,190,727 | McKenna | Feb. 20, 1940 |
| 2,734,667 | Conklin | Feb. 14, 1956 |
| 2,735,725 | Galle | Feb. 21, 1956 |